UNITED STATES PATENT OFFICE.

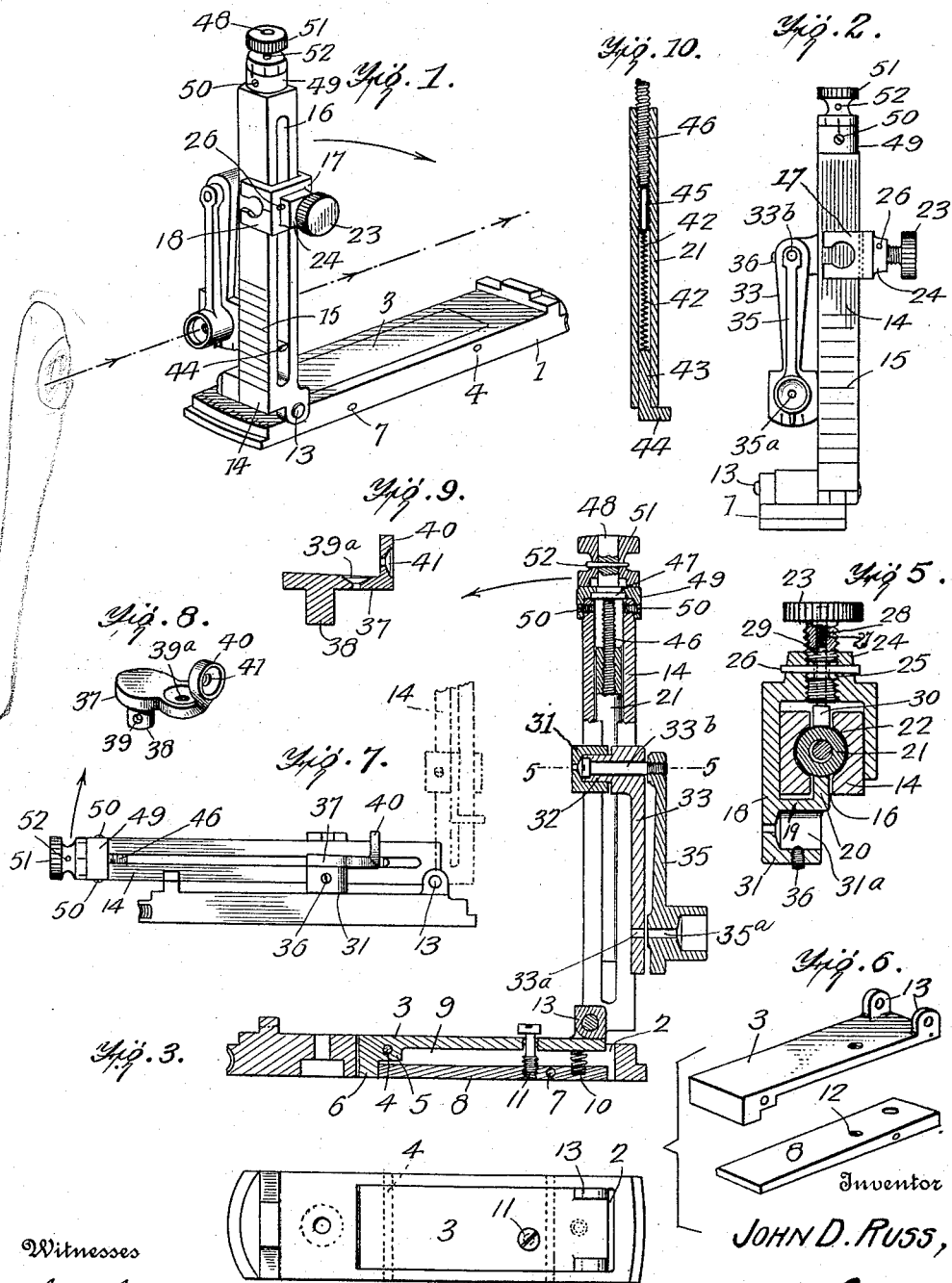
J. D. RUSS.
GUN SIGHT.
APPLICATION FILED MAY 24, 1911.
1,017,234. Patented Feb. 13, 1912.
Inventor
JOHN D. RUSS,

JOHN D. RUSS, OF SPENCER, WEST VIRGINIA.

GUN-SIGHT.

1,017,234. Specification of Letters Patent. Patented Feb. 13, 1912.

Application filed May 24, 1911. Serial No. 629,129.

*To all whom it may concern:*

Be it known that I, JOHN D. RUSS, a citizen of the United States, residing at Spencer, in the county of Roane and State of West Virginia, have invented new and useful Improvements in Gun-Sights, of which the following is a specification.

One of the objects of my invention is to provide a gun-sight for sporting and military purposes, which will overcome certain faults inherent in the sight of the ordinary high-power military rifle, and afford a military sight with a narrow leaf which does not obscure the soldier's vision nearly as much as does the old style leaf heretofore used, and which, at the same time, compensates for the drift of the ball in as efficient a manner as the old style heretofore used. My device also contemplates the provision of a micrometer adjustment of the elevation-slide.

It is a well known fact that the present high-power military rifle soon becomes heated when used for rapid firing, and that, consequently, the tendency is to raise the ball on the target; in other words, the rifle, under such conditions, shoots too high for the point at which the sight is set when the rifle is not heated. It is one of the objects of my invention, therefore, to overcome this objectionable feature; and, to compensate for this deviation, I use a peculiar and novel form of base carrying a novel movable, hinged mount for the leaf, and dispose beneath the movable mount and in contact with the rifle-barrel, a member susceptible to heat and cold, such as a brass plate, adapted, when the rifle-barrel and, thus, the sensitive brass plate are heated, to expand and force upward the rear end of said movable mount and, thus, synchronously, to depress the front end of said mount (or that end to which the sight leaf is hinged) sufficiently to compensate for the degree the rifle shoots high when heated.

Another object which I have in view in my invention is to provide means whereby, when the rifle is canted to the right or left from the proper position, the vision of the operator through the sight-aperture is automatically obscured; this device being useful in instructing novices to shoot, to impress upon them the proper way to hold the rifle, and to cure the canting habit so common among new recruits in the army.

Subsidiary objects of improvement, going to make up the ultimate perfection of the whole device, will appear as the specification proceeds and the nature of the invention more fully appears.

In the accompanying drawing, forming part of my specification and in which like numerals of reference indicate corresponding parts throughout the several views: Figure 1 is a perspective view of my invention; Fig. 2 is a rear elevation thereof; Fig. 3 is a longitudinal, central, vertical section through my invention; Fig. 4 is a top plan view; the leaf and the elevation-slide and other parts carried by the leaf being removed; Fig. 5 is a horizontal sectional view on the line 5—5, Fig. 3, the members 33, 35 provided with the sight-apertures being removed; Fig. 6 is a collective detail view of the movable mount and the plate sensitive to changes in temperature; Fig. 7 is a side elevation of the device, with the sight-leaf in lowered position; and, in this figure, the sight-aperture member shown in Figs. 8 and 9 is shown as substituted for the sight-aperture members shown in Fig. 1 *et seq.;* Figs. 8 and 9 are detail views, in perspective and in central longitudinal vertical section, respectively, of a sight-aperture member which may be substituted for those shown in Fig. 1 *et seq.;* and Fig. 10 is a central vertical longitudinal section through the movable cylinder, showing the contained parts.

Referring, now, in detail to the drawing:
1 indicates a base, which may be a windgage base, *i. e.*, mounted in any of the well known ways on the rifle-barrel so as to be movable to the right and left thereof, to compensate for the deflection of the bullet caused by air-currents traveling in a direction at an angle to the line of projection of the bullet. Said base 1 is slotted, as shown at 2, to provide for the insertion therein of a movable mount 3 for the sight-leaf 14, said mount being pivoted or hinged, as at 4, to said base 1. Said mount 3 is provided, toward the rear end thereof, with a bottom shoulder 5 and, at the extreme rear end thereof, with a downward-extending toe, flange or lug 6. Disposed beneath the mount 3 and secured to said base 1, as by a pin 7, is a member 8 sensitive to heat and cold. This member may be and preferably is a plate as shown, and is constructed of any suitable material for the purpose, such as brass. One end of this plate extends beneath the shoulder 5 and bears against the toe 6, as shown, the shoulder 5 thus forming a space or clearance 9 between the major portion of the plate 8 and the mount 3. A spring (in this instance, shown as a spiral spring, though it might be a leaf spring, if desired) 10 is disposed between the under surface of the mount 3 and the upper surface of the plate 8 and preferably, of course, toward the end of the plate opposite that at which it bears against the toe 6; this spring serving, normally, to keep the mount 3 elevated (as shown in Fig. 3). But, in operation, as soon as the rifle-barrel becomes heated from rapid firing, the brass plate 8 (which is in contact with and, thus, susceptible to varying temperatures of the rifle-barrel) expands, causing the end thereof in contact with the toe 6 to rock the mount 3 on its pivot or hinge 4, overcoming the tension of the spring 10, thus raising the rear end of the mount and depressing the front end thereof, or that end to which the sight-leaf 14 is hinged. In this manner, the tendency, when the rifle barrel is overheated, to raise the bullet on the target (i. e., to shoot too high) is automatically compensated for; this automatic compensation feature being a valuable feature of my invention. I also preferably provide a micrometer-screw 11 carried by the mount 3 and adapted, when screwed down, to engage a screw-opening 12 in the plate 8. Thus, when the micrometer-screw 11 is screwed down so as to engage the plate 8, it changes the mount 3 from a compensated mount to a micrometer-mount. Hinged to ears 13, 13, carried by the mount 3, is the leaf 14, provided with a scale 15, as usual. Said leaf is provided with a longitudinal slot 16, extending nearly the entire length thereof.

17 is the elevation-slide. It is formed as a yoke 18 which embraces three of the walls of said leaf 14, and carries a flange 19 having a lip 20 extending into the slot 16 of the leaf 14 and engaging a movable member 21 carried within the central longitudinal channel 22 (which latter is intersected by said slot 16), and formed as a hollow cylinder or sleeve of a length less than that of the leaf 14, within which it travels.

23 is a thumb-screw extending through a threaded opening in one wall of said elevation-slide 17 and through a continuation of said threaded opening formed in an enlargement or boss 24 carried by said wall; the thread of the shank of said screw being interrupted intermediate of its length, as at 25, for a suitable distance, such interruption of the thread extending entirely around the periphery of said shank. Carried by said boss 24 is a pin 26, extending transversely of the shank of the screw 23 and engaging the exterior of said interrupted-thread portion of said shank, and constituting a stop to limit outward movement of the said screw and, thus, disengagement thereof from the boss 24. Carried within a longitudinal central socket 27 of the screw 23 is a coiled spring 28, bearing against the free end of a stem or plunger 29 projecting into said socket 27 and carrying at its other end an enlarged head 30 bearing at all times against the cylinder 21 at a point thereof diametrically opposite the point of contact with said cylinder of said lip 20 (all as shown in Fig. 5). It will be noted that, by screwing in the screw 23, the end thereof will bear against one end of the head 30, causing the other end of said head to bind against the cylinder 21 and, at the same time, the lip 20 will be drawn into close engagement with the cylinder 21, whereby the elevation-slide 17 will move in unison with said cylinder 21. I consider the spring 28 and the plunger 29, with its head 30, an important feature of my invention, since, by this construction, the head 30 is at all times forced by the spring 28 against the cylinder 21 and holds the elevation-slide 17 temporarily against movement until the operator can securely lock the elevation-slide 17 by screwing in the screw 23. The pressure or tension of the spring 28 contributes very largely to preventing the screw 23 jarring loose and, thus, allowing the elevation-slide 17 to fall without the shooter's knowledge. This spring 28 and plunger 29 can be used on all forms of moving elevation-slides, and may be used, for instance, on the present form of military sight on the new Springfield rifle, with excellent results.

The elevation-slide 17 carries (desirably integral therewith) a socket-piece 31, having a socket 31$^a$ therein, in which may be disposed the right-angled end portion 32 of a stationary sight-piece 33, having a sight-aperture 33$^a$ therethrough toward its lower end. Pivotally carried by said stationary sight-piece 33, as at 33$^b$, is a second sight-piece 35, having a corresponding, registering sight-aperture 35$^a$ therethrough. A screw 36, or the like, secures the stationary sight-piece 33 in said socket-piece 31, against movement; but, by loosening said screw, the sight-piece 33, together with the pivoted sight-piece 35, which it carries, may be entirely removed from said socket-piece 31. Now, it will be noticed by the description of the structure just recited, that, if the rifle be held improperly, i. e., canted to the right or left, as invariably happens with a raw recruit, the pivoted sight-piece 35 will swing on its pivot 33$^b$ in the direction in which the rifle is canted, thus bringing the sight-aperture 35$^a$ out of register with the sight-aperture 33$^a$, and obscuring or blanking the view therethrough. Any suitable means may be provided to limit the range of movement of the pivoted sight-piece 35, if desired. Every time the vision of the novice is obscured through said sight-apertures, he is warned that he is canting the rifle, i. e., holding the same improperly, and, thus, my double sight-pieces 33, 35 (one thereof stationary and the other pivoted) will cure the canting habit so frequent with beginners.

When desired, the set-screw 36 may be loosened, the sight-pieces 33, 35 entirely removed from the socket 31ª, and the sight-piece 37 (shown in detail in Figs. 8 and 9 and in position on the elevation-slide 17 in Fig. 7) substituted; said sight-piece 37 having a stem 38 fitting the socket 31ª, and into a transverse hole 39 therein the set-screw 36 may be screwed to secure the sight-piece 37, against movement, in assembled position with the elevation-slide 17. Said sight-piece 37 also has a sight-aperture 39ª therethrough through which a vision may be had when the leaf 14 is in elevated position, as shown in dotted lines in Fig. 7. The sight-piece 37 is also provided with a right-angled extension 40, provided with a sight-aperture 41 therethrough, through which a vision may be had when the leaf 14 is in depressed or lowered position, as shown in full lines in Fig. 7.

Carried within the cylinder 21 is a coiled spring 42 (Fig. 10) bearing at its lower end against the upper end of a plug 43, which may be secured against independent movement to said cylinder 21, and which has a lower, right-angled toe 44 riding in the slot 16 of the leaf 14, and which serves to limit downward movement of the elevation-slide 17 and to prevent disengagement thereof from the cylinder 21; that is to say, when the elevation slide 17 is moved downward, the head 30 contacts with the toe 44, preventing the head from slipping off of the cylinder 21 and becoming disengaged therefrom. Said spring 42 bears at its upper end against, or is secured directly to, a pin or stem 45, which bears at its upper end against the lower end of a screw 46, carrying at the top of its screw-threaded portion a collar 47 (integral with, or fixed to, said screw), and bearing upon the top of the leaf 14. The remainder of the shank of the screw 46 above the collar 47 is threadless, as shown at 48, and this threadless portion is enlarged, as shown, constituting, as it were, an elongated head. The micrometer-screw 46 is in threaded engagement with the cylinder 21, as shown in Figs. 3 and 10. A detachable ring 49 is secured to the top of the leaf 14, as by screws 50, 50, and bears down upon the collar 47, as shown in Fig. 3, whereby upward movement of the collar and, consequently, of the screw 46 is prevented. A micrometer thumb-nut 51 encircles the screw-head 48, and is secured thereto in any suitable manner, as by a pin 52, so that, as the micrometer thumb-nut is revolved, the micrometer-screw 46 will be revolved in unison, to raise or lower the cylinder 21, which the screw 46 engages.

From the above description, taken in connection with the drawing, the many advantages of my invention will be apparent, especially to those skilled in the art to which the invention appertains.

It is understood, of course, that I do not confine the application of the "compensating" feature of my invention, i. e., the movable mount and the brass plate, to use in connection with the rear sight, as it may, if desired, be used on the front sight.

It is also to be understood that many changes in the details of my invention may be made, and that well-known mechanical equivalents may be utilized; but that all such changes as come within the terms of the appended claims, and all such mechanical equivalents as are recognized by the courts, constitute no departure from my invention, and fall within the scope and purview thereof.

Having thus fully described my invention, what I claim as new and desire to secure by Letters-Patent is:

1. In a gun-sight, a hinged leaf-mount, a sight-leaf hinged thereto, and means, expansible by heat, co-acting with said mount to automatically depress the end of said mount to which said leaf is hinged upon heating of the rifle-barrel in rapid firing.

2. In a gun-sight, a pivoted leaf-mount, a sight-leaf hinged thereto, and a member, expansible by heat, co-acting with said mount to automatically depress the end of said mount to which said leaf is hinged upon heating of the rifle-barrel in rapid firing.

3. In a gun-sight, a pivoted leaf-mount, a sight-leaf hinged thereto, and a member, expansible by heat, disposed beneath said mount and automatically depressing the end of said mount to which said leaf is hinged upon heating of the rifle-barrel in rapid firing.

4. In a gun-sight, a pivoted leaf-mount provided with a downward-extending toe at one end thereof, and a member, expansible by heat, disposed beneath said mount and bearing against said toe and automatically depressing the end of said mount to which said leaf is hinged upon heating of the rifle-barrel in rapid firing.

5. In a gun-sight, a base provided with a slot, a leaf-mount disposed in said slot and pivoted to said base, and a member, expansible by heat, disposed beneath said mount and automatically depressing the end of said mount to which the leaf is hinged upon heating of the rifle-barrel in rapid firing.

6. In a gun-sight, a base provided with a slot, a leaf-mount disposed in said slot and pivoted to said base and provided with a downward-extending toe at one end thereof, and a member, expansible by heat, disposed beneath said mount and bearing against said toe and automatically depressing the end of said mount to which the leaf is secured upon heating of the rifle-barrel in rapid firing.

7. In a gun-sight, a base provided with a slot, a leaf-mount disposed in said slot and pivoted to said base and provided with a downward-extending toe at one end thereof, a member, expansible by heat, disposed beneath said mount and bearing against said toe and automatically depressing the end of said mount to which the leaf is hinged upon heating of the rifle-barrel in rapid firing, and a spring disposed between said mount and said member.

8. In a gun-sight, a sight-leaf carrying interiorly a movable member, an elevation-slide carried by said leaf, a thumb-screw carried by said elevation-slide and having a longitudinal, interior socket in the shank thereof, a plunger projecting into said socket, and a spring also disposed in said socket and bearing against one end of said plunger and operating to force the other end thereof against said movable member.

9. In a gun-sight, a sight-leaf carrying interiorly a movable member, an elevation-slide carried by said leaf, a thumb-screw carried by said elevation-slide and having a longitudinal, interior socket in the shank thereof, a plunger projecting into said socket and carrying at one end a head adapted to bear against said movable member, and a spring also disposed in said socket and bearing against the other end of said plunger to force said head against said movable member.

10. In a gun-sight, a pivoted leaf-mount, a sight-leaf hinged thereto, a member, expansible by heat, disposed beneath said mount and automatically depressing the end of said mount to which said leaf is hinged upon heating of the rifle-barrel in rapid firing, and an adjusting-screw carried by said leaf-mount and adapted to engage said member.

11. In a gun-sight, a pivoted sight-leaf, a hollow cylinder disposed within said sight-leaf and movable therein, an elevation-slide movable up and down said sight-leaf and carrying means engaging said cylinder, whereby said elevation-slide and cylinder may move in unison, a micrometer-screw engaging said cylinder, and a pin and a spring carried within said cylinder.

In testimony whereof I have hereunto set my hand in presence of two subscribing witnesses.

JOHN D. RUSS.

Witnesses:
T. F. DURFIN,
CORA BOOTH.

---

Copies of this patent may be obtained for five cents each, by addressing the "Commissioner of Patents, Washington, D. C."